US012698045B2

(12) United States Patent
Clint et al.

(10) Patent No.: US 12,698,045 B2
(45) Date of Patent: Aug. 4, 2026

(54) COMPACT UTILITY VEHICLE

(71) Applicant: The Toro Company, Bloomington, MN (US)

(72) Inventors: Patrick J. Clint, Minnetonka, MN (US); Jeremy A. Fohrenkamm, Hastings, MN (US); Jeffrey L. Gardner, Hudson, IA (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 19/170,478

(22) Filed: Apr. 4, 2025

(65) Prior Publication Data

US 2025/0229852 A1 Jul. 17, 2025

Related U.S. Application Data

(63) Continuation of application No. 18/750,932, filed on Jun. 21, 2024, now Pat. No. 12,269,542.

(Continued)

(51) Int. Cl.
*B62D 51/00* (2006.01)
*B60P 1/04* (2006.01)
(Continued)

(52) U.S. Cl.
CPC ............. *B62D 51/001* (2013.01); *B60P 1/04* (2013.01); *G05G 1/01* (2013.01); *G05G 1/04* (2013.01);
(Continued)

(58) Field of Classification Search
CPC ........... B62D 51/001; B60P 1/04; G05G 1/01; G05G 1/04; G05G 5/05; G05G 9/047; G05G 2009/04774; G05G 2505/00
See application file for complete search history.

(56) References Cited

U.S. PATENT DOCUMENTS 3,941,009 A * 3/1976 Brown .................... F16H 59/02
74/543
6,148,593 A * 11/2000 Heinsey ................... G05G 1/01
701/50

(Continued)

FOREIGN PATENT DOCUMENTS

WO 2022139983 6/2022

*Primary Examiner* — Toan C To
(74) *Attorney, Agent, or Firm* — Merchant & Gould P.C.

(57) ABSTRACT

A compact utility vehicle including a chassis supporting a prime mover, ground engaging wheels or tracks, an implement, and a rear standing platform operably coupled to the chassis. The vehicle can be equipped with a control console that is operably coupled to the chassis at an elevation above the rear standing platform. The console can have two manual input devices, including a first manual input device configured to control the ground engaging wheels or tracks located along the lateral direction of the vehicle between a longitudinal centerline of the vehicle and 50% of a distance to a first side of the control console, and a second manual input device defining a rigid grip and a thumb switch control portion to control the operation of the implement, located along the lateral direction of the vehicle between the longitudinal centerline of the vehicle and 50% of a distance to a second side of the control console.

20 Claims, 14 Drawing Sheets

Related U.S. Application Data

(60) Provisional application No. 63/509,834, filed on Jun. 23, 2023.

(51) Int. Cl.
| | |
|---|---|
| *G05G 1/01* | (2008.04) |
| *G05G 1/04* | (2006.01) |
| *G05G 5/05* | (2006.01) |
| *G05G 9/047* | (2006.01) |

(52) U.S. Cl.
CPC .............. *G05G 5/05* (2013.01); *G05G 9/047* (2013.01); *G05G 2009/04774* (2013.01); *G05G 2505/00* (2013.01)

(56) References Cited

U.S. PATENT DOCUMENTS

| | | | |
|---|---|---|---|
| 6,709,223 | B2 | 3/2004 | Walto et al. |
| 7,399,038 | B2 | 7/2008 | Vandewinckel et al. |
| 7,730,577 | B2 | 6/2010 | Wood |
| 7,980,569 | B2 | 7/2011 | Azure et al. |
| 8,037,952 | B2 | 10/2011 | Bock |
| 8,069,927 | B2 | 12/2011 | Bachstein et al. |
| 8,276,476 | B2 * | 10/2012 | Diccion ............... E02F 9/2004 180/315 |
| 8,887,597 | B2 | 11/2014 | Black |
| 9,342,091 | B2 * | 5/2016 | Wuisan .................... G05G 1/04 |
| 9,643,705 | B2 | 5/2017 | Steven |
| 9,970,176 | B2 | 5/2018 | Azure et al. |
| 10,331,233 | B2 * | 6/2019 | Parazynski ........... G06F 3/0346 |
| 10,344,453 | B2 | 7/2019 | Binstock et al. |
| 10,640,950 | B2 | 5/2020 | Kure et al. |
| 11,194,407 | B2 * | 12/2021 | Parazynski ........... G06F 3/0346 |
| 11,199,914 | B2 * | 12/2021 | Parazynski ........ G05G 9/04788 |
| 11,281,308 | B2 * | 3/2022 | Parazynski ........... G08C 19/16 |
| 11,305,806 | B2 * | 4/2022 | Carlson .................... G05G 9/00 |
| 11,987,483 | B2 * | 5/2024 | Hinders ............... B66F 9/0759 |
| 12,269,542 | B2 * | 4/2025 | Clint .................... B62D 51/001 |
| 2006/0243517 | A1 * | 11/2006 | Lohmann ................. B62B 5/06 180/333 |
| 2015/0253801 | A1 * | 9/2015 | Wuisan .................... G05G 1/58 74/491 |
| 2016/0244937 | A1 | 8/2016 | Azure et al. |
| 2019/0325651 | A1 * | 10/2019 | Bradner .................. G06F 3/011 |
| 2022/0195697 | A1 * | 6/2022 | Fredrickson .......... E02F 9/2004 |
| 2023/0223219 | A1 * | 7/2023 | Morrison ............... H01H 23/04 200/339 |
| 2023/0304252 | A1 | 9/2023 | Azure et al. |
| 2023/0384817 | A1 * | 11/2023 | Kim ...................... G05G 9/047 |
| 2024/0068199 | A1 | 2/2024 | Durkin et al. |
| 2024/0161593 | A1 | 5/2024 | Lepp et al. |

* cited by examiner

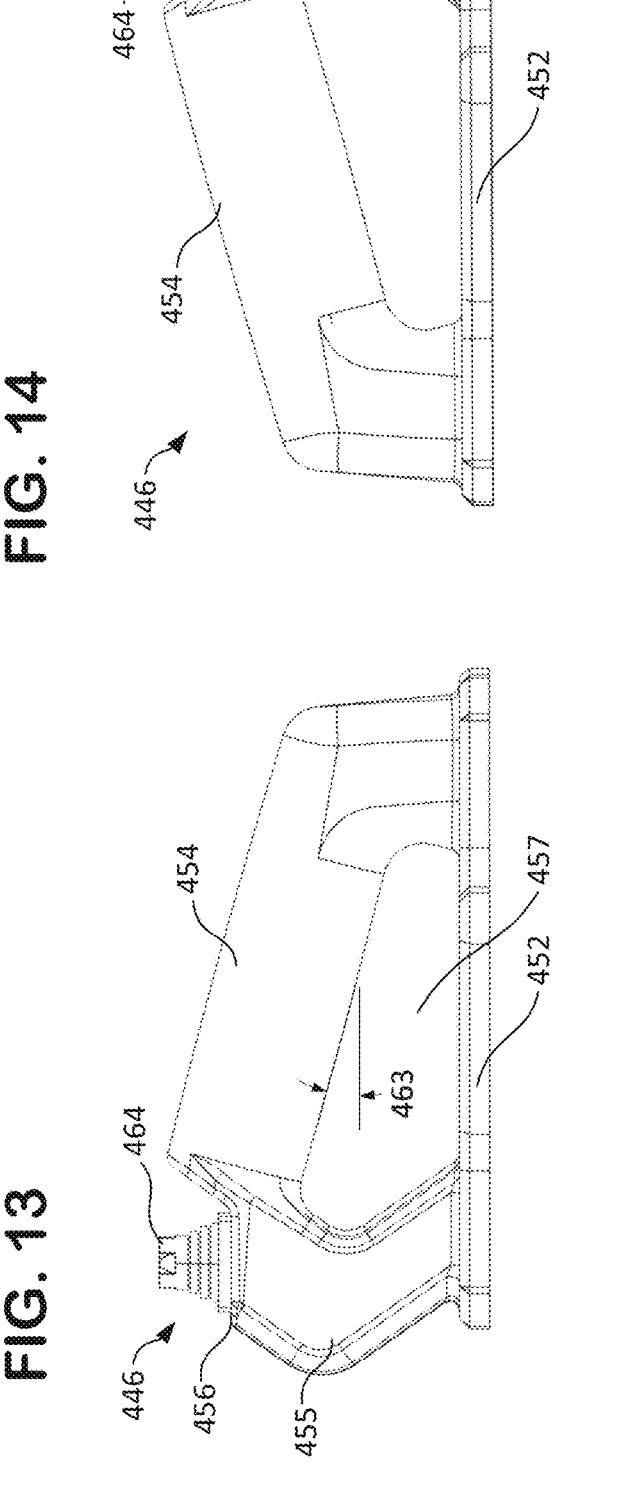
FIG. 14
FIG. 13
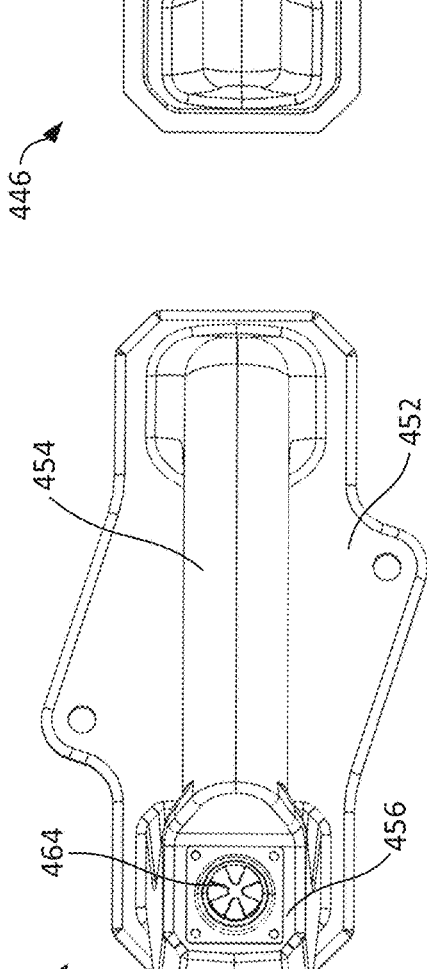
FIG. 16
FIG. 15

546

554a

556a

556

564

554

563

552

546

554

552

546

556

564

554

552

546

460

556

552

COMPACT UTILITY VEHICLE

RELATED APPLICATION

This application is a Continuation of U.S. patent application Ser. No. 18/750,932, filed on Jun. 21, 2024, now U.S. Pat. No. 12,269,542; which claims priority to U.S. Provisional Application Ser. No. 63/509,834, filed on Jun. 23, 2023, the entire disclosures of which are incorporated herein by reference.

TECHNICAL FIELD

The present invention generally relates to powered material transporting vehicles, and more particularly to ride-behind and walk-behind vehicles with input devices for use in controlling powered material transporting vehicles.

BACKGROUND

Compact utility vehicles known as powered material transporting vehicles are designed for hauling loads ranging from a few hundred pounds to a few tons. These vehicles typically feature a chassis with wheels, a storage bucket or tub at the front, and a power source for propulsion and operating other equipment. They are commonly used for carrying soft or granular materials such as mortar, sand, and gravel, and come equipped with metal or plastic hoppers of varying sizes.

In many instances, the vehicle is operated by the user through a steering mechanism, speed control, engine controls, and dump controls, with the steering typically being achieved through handles that may feature squeeze levers. In certain instances, the handle section can be installed on the machine through a multi-axial pivoting mechanism, allowing for displacement and/or rotation motion of the handle relative to a base in one or more directions or axes. Sensors positioned on the handle's base provide control signals to a controller, indicating the handle's motion or displacement, which are then translated into machine commands.

In certain machines where the operator is standing during operation, such as compact utility loaders and powered material transporting vehicles, sudden machine movements can interfere with the operator's ability to control the machine with precision. Improvements are desired.

SUMMARY

Aspects of the present disclosure relate to a manual input device installed on a compact utility vehicle, such as powered material transporting vehicle or other machine where the operator is standing during operation in a position behind the vehicle. In embodiments, the input device is positioned adjacent to the operator station and is designed to be engaged by the operator's hand. The manual input device can include a handle portion having an elongate shape rigidly connected to the frame of the vehicle, and a control portion including control surfaces accessible to the operator's thumb associated with sensors that provide control signals to a controller to control operational aspects of the vehicle.

In some examples, the compact utility vehicle can include a chassis, a rear standing platform, a control console, a first manual input device, and a second manual input device. The chassis can support a prime mover, ground engaging wheels or tracks, and an implement. The rear standing platform can be operably coupled to the chassis. The control console can be operably coupled to the chassis at an elevation above the rear standing platform. The first manual input device operably can be coupled to the control console, the first manual input device defining a first longitudinal centerline spaced along a first width of the control console defined along a lateral direction of the vehicle between a longitudinal centerline of the vehicle and 50% of a distance to a first side of the control console, the first manual input device configured to control the ground engaging wheels or tracks. The second manual input device operably can be coupled to the control console, the second manual input device defining a second longitudinal centerline spaced along a second width of the control console defined along the lateral direction of the vehicle between the longitudinal centerline of the vehicle and 50% of a distance to a second side of the control console, the second manual input device defining a rigid elongate grip, and a thumb switch control portion to provide signals to control operation of the implement.

In one embodiment, the compact utility vehicle has a first longitudinal centerline and a second longitudinal centerline that are spaced along the lateral direction within 10 inches of either side of the longitudinal centerline of the vehicle. In one embodiment, the first longitudinal centerline and the second longitudinal centerline are spaced within a biacromial breadth of a user standing on the rear standing platform. In one embodiment, the rigid elongate grip provides a palmer gripping surface angled relative to the base portion of the input device at an angle between 15 degrees and 45 degrees. In one embodiment, the thumb switch control portion defines a plurality of control surfaces associated with sensors. In one embodiment, the thumb switch control portion is biased to a default position associated with the home position of the implement. In one embodiment, the control console, first manual input device, and second manual input device are positioned along the longitudinal direction of the vehicle forward of the rear standing platform.

In one embodiment, the rear standing platform is movable between a substantially longitudinally oriented use position and a substantially vertically oriented storage position. In one embodiment, the first manual input device is a dual joystick or dual lever control system including one or more pivotal control members. In one embodiment, the control console further includes one or more guardrails positioned adjacent to the first manual input device to prevent accidental actuation. In one embodiment, the first manual input device is positioned on the left side of the vehicle and the second manual input device is positioned on the right side. In one embodiment, the implement is a bucket that can pivot relative to the lateral direction of the chassis between a lowered, loaded position and a raised, dumping position. In one embodiment, the bucket can pivot relative to the vertical direction of the chassis over a range of 180 degrees. In one embodiment, the bucket can be raised in elevation along the vertical direction of the chassis between a lowered position and a raised position, with the thumb switch control portion defaulting to the lowered position. In one embodiment, the implement is a loader bucket, fork, auger, or trencher.

In some examples, the compact utility vehicle can include a chassis, a rear standing platform, a control console, a first manual input device, and a circuit manual input device. The chassis can support a prime mover, ground engaging wheels or tracks, and an implement. The rear standing platform can be operably coupled to the chassis. The control console can be operably coupled to the chassis at an elevation above at least a portion of the rear standing platform. The first manual input device can be operably coupled to the control console, the first manual input device defining a first longitudinal centerline, the first manual input device configured to control the ground engaging wheels or tracks. The second manual input device can be operably coupled to the control console, the second manual input device defining a second longitudinal centerline, the second manual input device defining a rigid elongate grip, and a thumb switch control portion to provide signals to control operation of the implement. In embodiments, the first longitudinal centerline and the second longitudinal centerline can be spaced along a lateral direction of the vehicle within the biacromial breadth of the user standing on the rear standing platform.

In one embodiment, the first longitudinal centerline and the second longitudinal centerline are spaced along a width of the control console defined along the lateral direction of the vehicle between a longitudinal centerline of the vehicle and 50% of a distance to at least one of a first or second side of the control console. In one embodiment, the first longitudinal centerline and the second longitudinal centerline are spaced along the lateral direction within 10 inches either side of the longitudinal centerline of the vehicle.

In some examples, the compact utility vehicle can include a chassis, a rear standing platform, a control console, a first manual input device, and a second annual input device. The chassis can support a motor, ground engaging wheel or tracks, and an implement. The rear standing platform can be operably coupled to the chassis, the rear standing platform defining a width extending parallel to a lateral direction of the vehicle between a first side and a second side. The control console can be operably coupled to the chassis at an elevation above at least a portion of the rear standing platform. The first manual input device can be operably coupled to the control console spaced along the lateral direction of the vehicle between a longitudinal centerline of the vehicle and the first side of the rear standing platform, the first manual input device configured to control at least one of the motor or ground engaging wheels or tracks. The second manual input device can be operably coupled to the control console spaced along the lateral direction of the vehicle between the longitudinal centerline of the vehicle and the second side of the rear standing platform, the second manual input device defining a rigid elongate grip and a thumb switch control portion to control operation of the implement.

In one embodiment, a first longitudinal centerline of the first manual input device, and a second longitudinal centerline of the second manual input device are spaced along a width of the control console defined along the lateral direction of the vehicle between the longitudinal centerline of the vehicle and 50% of a distance to at least one of a first or second side of the control console. In one embodiment, a first longitudinal centerline of the first manual input device and a second longitudinal centerline of the second manual input device are spaced along a lateral direction of the vehicle within 10 inches either side of the longitudinal centerline of the vehicle. In one embodiment, the first longitudinal centerline of the first manual input device and the second longitudinal centerline of the second manual input device are spaced along the lateral direction of the vehicle within the biacromial breadth of the user standing on the rear standing platform.

In some examples, a manual input device for a compact utility vehicle can include a base portion, a rigid elongate grip, and a control head. The base portion can be operably couplable to a supporting surface of the vehicle. The rigid elongate grip can define a bend of between about 30 degrees and about 45 degrees between a first portion operably coupled to the base portion, and a second portion defining a palmer gripping surface angled relative to a base portion of the input device at an angle of between about 15 degrees and about 45 degrees. The control head can be operably coupled to the second portion of the ridge elongate grip, the control head supporting a thumbstick defining a plurality of control surfaces associated with sensors to provide signals to control operation of the vehicle.

In one embodiment, the thumbstick is biased to a default position. In one embodiment, the manual input device further includes at least one of a dual joystick or dual lever control system. In one embodiment, s first manual input device is positioned on a left side of the vehicle and s second manual input device is positioned on a right side of the vehicle. In one embodiment, the manual input device further includes one or more guardrails positioned adjacent to the dual joystick or dual lever control system to inhibit inadvertent actuation of the dual joystick or dual lever control system.

One aspect of the present disclosure provides a method for operating a compact utility vehicle, including the steps of: standing on a rear platform of the vehicle, the rear platform defining a width extending parallel to a lateral direction of the vehicle between a first side and a second side; using a first hand to manipulate a first manual input device defining a first longitudinal centerline spaced along a first width of a control console defined along a lateral direction of the vehicle between a longitudinal centerline of the vehicle and 50% of a distance to a first side of the control console, the first manual input device configured to control at least one of a drive motor or ground engaging wheels or tracks; using a second hand to grip a rigid elongate grip of a second manual input device defining a second longitudinal centerline spaced along a second width of the control console defined along the lateral direction of the vehicle between the longitudinal centerline of the vehicle and 50% of a distance to a second side of the control console; and manipulating a thumb switch control portion of the second manual input device to control operation of an implement of the vehicle, wherein the thumb switch control portion includes a plurality of control surfaces actuatable by a thumb of a user.

Another aspect of the present disclosure provides a method for operating a compact utility vehicle by a user having a biacromial breadth, including the steps of: standing on a rear platform of the vehicle, the rear platform defining a width extending parallel to a lateral direction of the vehicle between a first side and a second side, using a first hand to manipulate a first manual input device defining a first longitudinal centerline spaced along a lateral direction of the vehicle within the biacromial breadth of the user standing on the rear standing platform, the first manual input device configured to control at least one of a drive motor or ground engaging wheels or tracks, using a second hand to grip a rigid elongate grip of a second manual input device defining a second longitudinal centerline spaced along a lateral direction of the vehicle within the biacromial breadth of the user standing on the rear standing platform, and manipulating a thumb switch control portion of the second manual input device to control operation of an implement of the vehicle, wherein the thumb switch control portion includes a plurality of control surfaces actuatable by a thumb of a user.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

Figures 10, 11, 12:
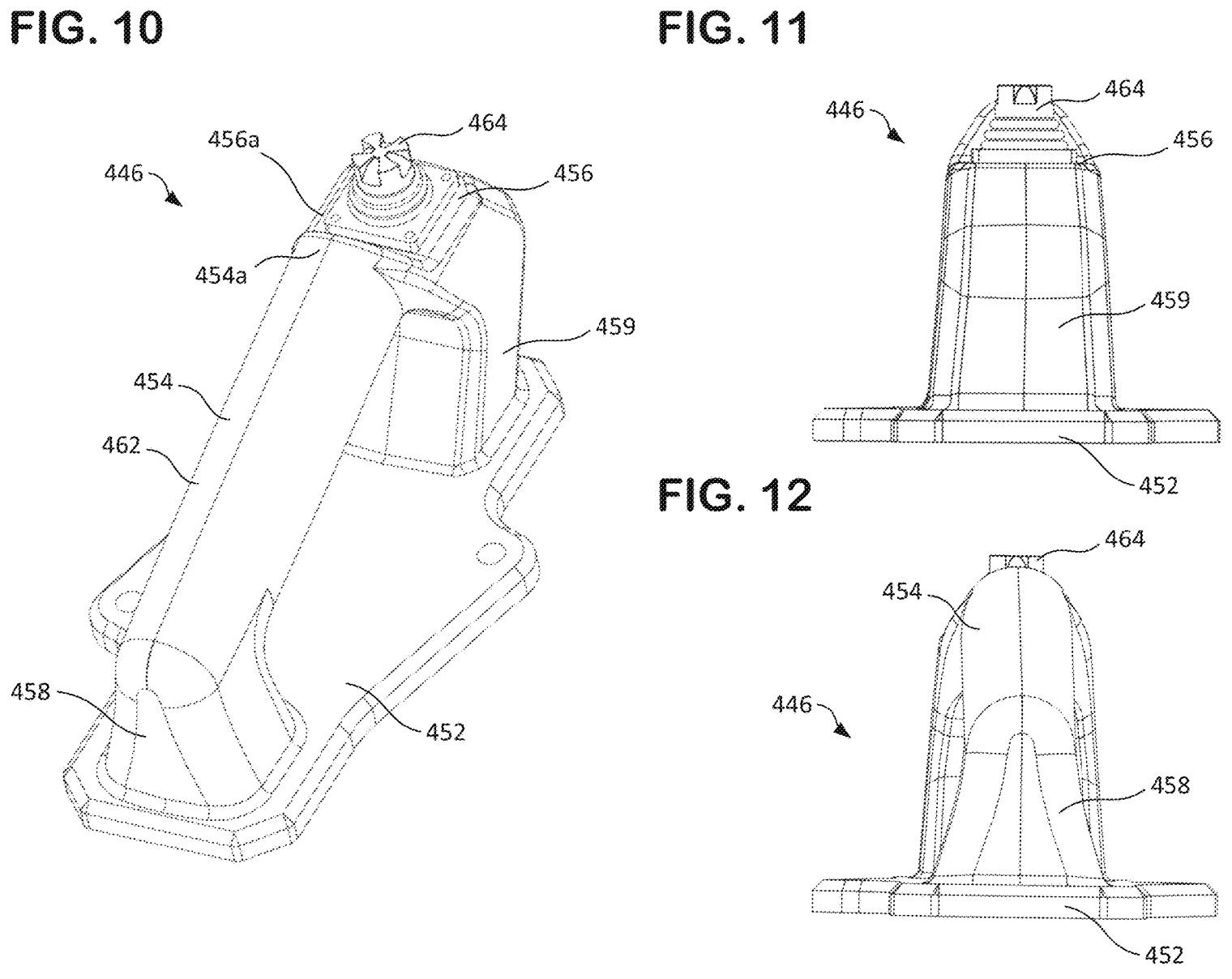

FIG. 10 is a perspective view depicting an example manual input device usable with the compact utility vehicles disclosed herein, and others.

FIG. 11 is a front end view of the manual input device shown in FIG. 10.

FIG. 12 is a rear end view of the manual input device shown in FIG. 10.

FIG. 13 is a first side view of the manual input device shown in FIG. 10.

FIG. 14 is a second side view of the manual input device shown in FIG. 10.

FIG. 15 is a top view of the manual input device shown in FIG. 10.

FIG. 16 is a bottom view of the manual input device shown in FIG. 10.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
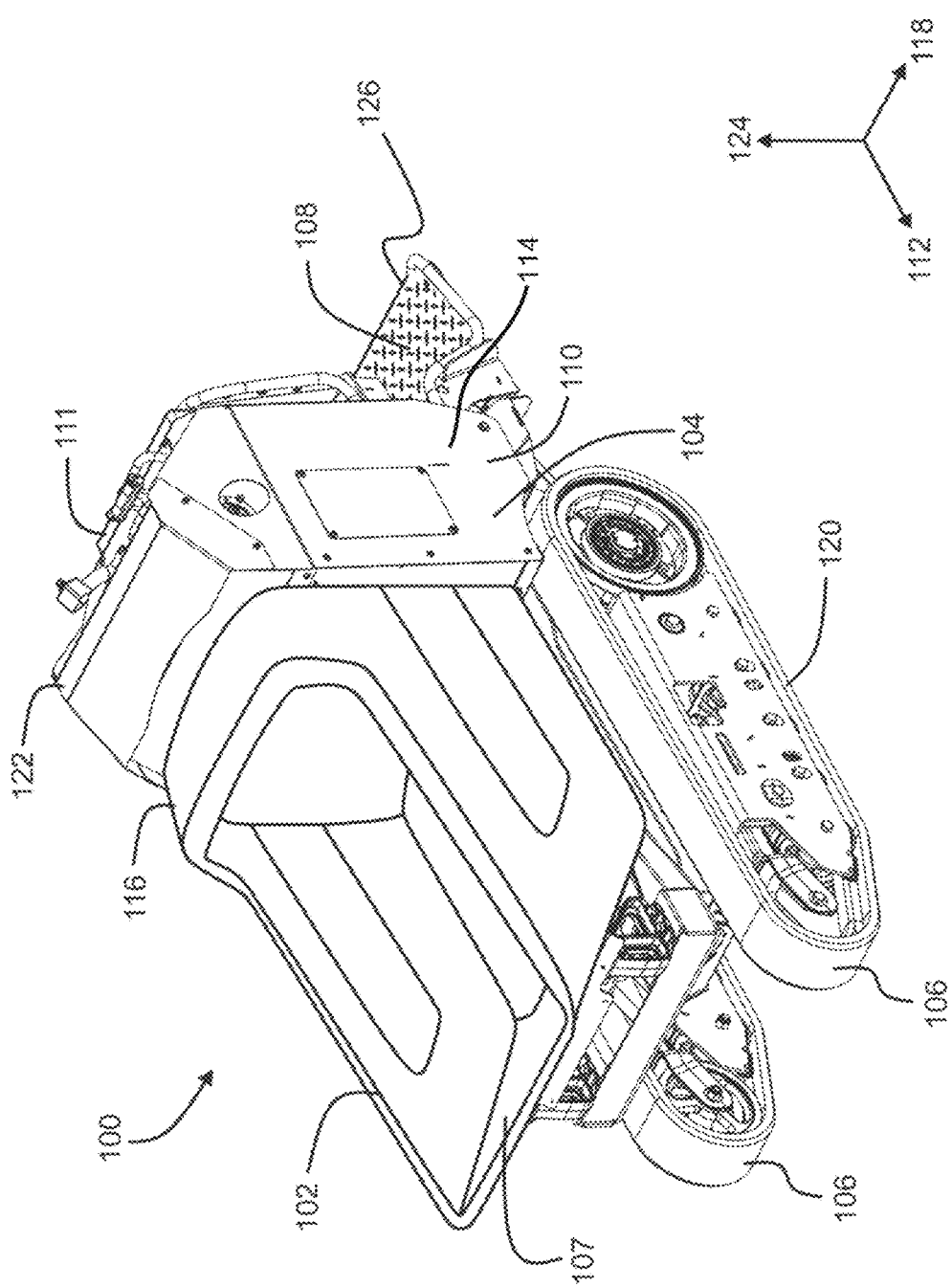
FIG. 1 is a perspective view depicting a compact utility vehicle, in accordance with an embodiment of the disclosure.

Referring to FIG. 1 a compact utility vehicle 100 is depicted in accordance with an embodiment of the disclosure. As depicted, the vehicle 100 is in the form of a powered material transporting vehicle, including an implement 102 in the form of a bucket mounted near a front of the vehicle 100. In other embodiments, such as that depicted in FIG. 7, the implement 102 can be at least one of a loader bucket, adjustable fork, grapple, auger, trencher, utility blade, or the like. The compact utility vehicle 100 may alternatively be referred to as a light or compact vehicle loader, dingo, buggy, or any combination of these terms in various embodiments.

Figure 2:
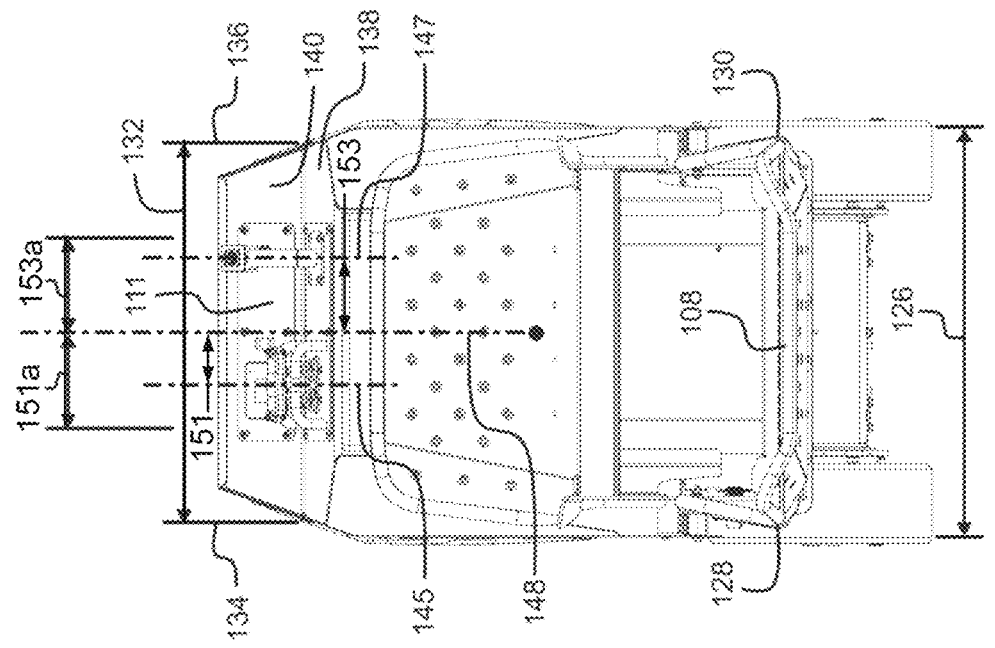
FIG. 2 is a rear elevation view depicting the compact utility vehicle of FIG. 1, in accordance with an embodiment of the disclosure.
Figure 2A:
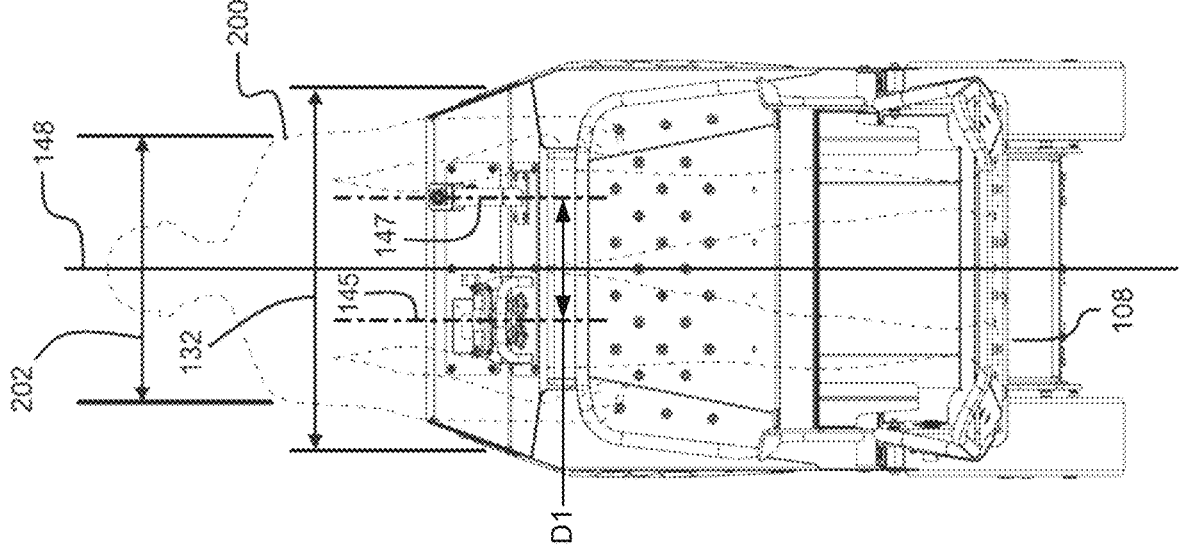
FIG. 2A is a rear elevation view depicting a compact utility vehicle with a user standing on a rear standing platform of the compact utility vehicle, in accordance with an embodiment of the disclosure.

The vehicle 100 can have a length extending between a front end 107 and a rear end 110 along a longitudinal direction 112 of the vehicle 100, a width extending between a first side 114 and a second side 116 along a lateral direction 118 of the vehicle 100, wherein a longitudinal centerline 148 (as depicted in FIGS. 2 & 2A) is substantially centered between the first side 114 and the second side 116, and a height extending between a bottom 120 and a top 122 along a vertical direction 124 of the vehicle 100. As used herein, positioning and orientational terms such as up, down, upper, lower, above, below, front, back, rear, forward, backward, rearward, horizontal, vertical, and so forth, may be used to refer to relative positioning of components in the vehicle 100 or portions of a component relative to each other when positioned in the vehicle 100. Such terminology is provided as a descriptive aid and does not limit how components or portions of components may be positioned or oriented in practice.

In embodiments, the vehicle 100 can include a chassis 104, which is supported and moved across the ground surface by one or more wheels or tracks 106. The one or more wheels or tracks 106 are powered by a prime mover, such as a power plant and drivetrain, which in embodiments, can be an internal combustion engine including a fuel tank or electric motor including a power supply, such as one or more battery packs. The prime mover can include a hydraulic system including pumps, hydrostatic transmissions, and/or one or more hydraulic motors configured to apply power to the one or more wheels or tracks 106. An example hydraulic system and related control arrangement can be found in U.S. Pat. No. 9,970,176.

Figure 3:
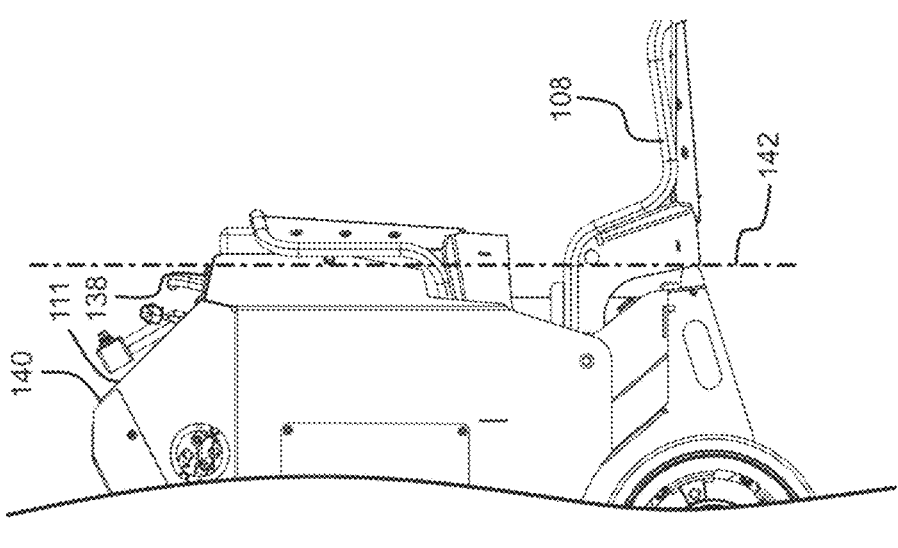
FIG. 3 is a partial left side elevation view depicting the compact utility vehicle of FIG. 1, in accordance with an embodiment of the disclosure.

During some phases of operation, the vehicle 100 is configured to be maneuvered by an operator standing on a rear platform 108 of the vehicle 100, by manipulation of one or more controls mounted to a base plate 111a of a control console 111. Both the rear platform 108 and the control console 111 can be operably coupled to the chassis 104. With additional reference to FIGS. 2-3, the rear platform 108 can define a width 126 extending parallel to the lateral direction 118 between a first side 128 and a second side 130. In embodiments, the rear platform 108 is movable or transitionable between a substantially longitudinally oriented use position (as depicted in FIGS. 1-3) and a substantially vertically oriented storage position (also depicted in FIGS. 1-3). For example, in one embodiment, the rear platform 108 can be pivotably coupled to the chassis 104 by one or more hinges or other pivotable connections.

The control console 111 can be positioned at an elevation above the rear platform 108, for example, some distance above the rear platform 108 along the vertical direction 124. The control console can also be defined by a width 132 extending between a first side 134 and a second side 136. In some embodiments, the width 132 of the control console 111 can be narrower or smaller in dimension than the width 126 of the rear platform 108. In other embodiments, the width 132 of the control console 111 can be wider or substantially the same dimension as width 126 of the rear platform 108. In some embodiments, the control console 111 can include one or more panels 138, 140, which can each be angled relative to the vertical direction 124 to provide both a horizontal component and a vertical component relative to a gravitational frame of reference. Further, in some embodiments, the control console 111 can be positioned along the longitudinal direction 112 forward of a forward edge 142 or at least a portion of the rear platform 108.

Figure 4:
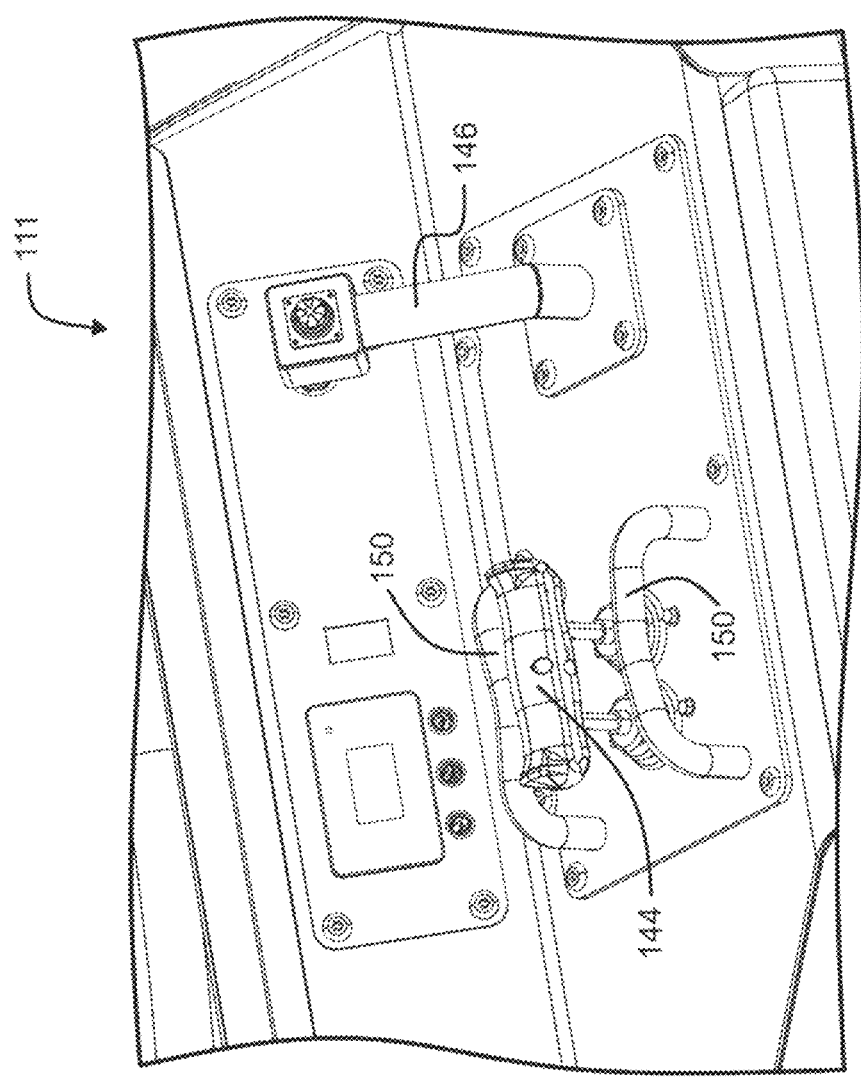
FIG. 4 is a close-up, perspective view of a control console of a compact utility vehicle, in accordance with an embodiment of the disclosure.
Figure 5:
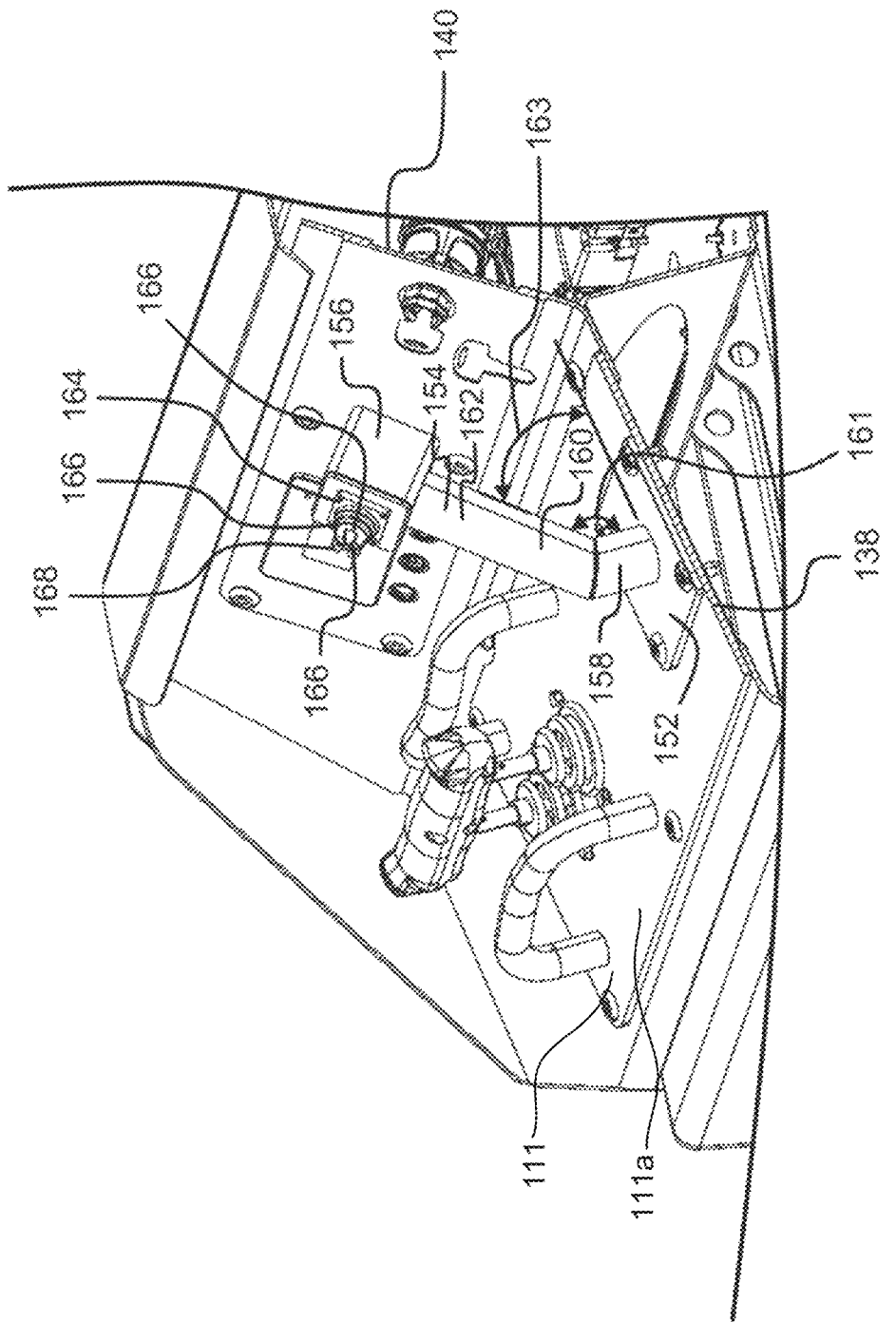
FIG. 5 is a close-up, cross-sectional view of a control console of a compact utility vehicle, in accordance with an embodiment of the disclosure.

With additional reference to FIGS. 4-5, close-up views of the control console 111 are depicted in accordance with an embodiment of the disclosure. In embodiments, the control console 111 can include a first manual input device 144 and a second manual input device 146. In embodiments, the first manual input device 144 can define a first longitudinal centerline 145, and the second manual input device 146 can define a second longitudinal centerline 147.

In some embodiments, the first manual input device 144 can be coupled to the control console 111, such that the first longitudinal centerline 145 of the first manual input device 144 is spaced along the lateral direction 118 of the vehicle 100 between the longitudinal centerline 148 of the vehicle 100 (as depicted in FIGS. 2 & 2A) and the first side 134 of the control console 111. The second manual input device 146 can be coupled to the control console 111, such that the second longitudinal centerline 147 of the second manual input device 146 is spaced along the lateral direction 118 of the vehicle 100 between the longitudinal centerline 148 of the vehicle 100 and the second side 136 of the control console 111. In other embodiments, the first and second manual input devices 144, 146 can be respectively positioned between the longitudinal centerline 148 of the vehicle 100 and at least one of the first or second side 128, 130 of the rear platform 108, or the first or second side 114, 116 of the of the vehicle 100.

In some embodiments, the first manual input device 144 can be coupled to the control console 111, such that the first longitudinal centerline 145 of the first manual input device 144 is spaced from the longitudinal centerline 148 of the vehicle 100 by a first width 151 defined along the lateral direction 118 of the vehicle 100. In examples, the first width 151 is within 50% of a distance from the longitudinal centerline 148 to the first side 134 of the control console 111. The second manual input device 146 can be coupled to the control console 111, such that the second longitudinal centerline 147 of the second manual input device 146 is spaced from the longitudinal centerline 148 of the vehicle 100 by a second width 153 defined along the lateral direction 118 of the vehicle 100. In examples, the second width 153 is within 50% of the distance from the longitudinal centerline 148 to the second side 136 of the control console 111. In some examples, the spacing between the longitudinal centerlines 145, 147 of the respective first and second manual input devices 144, 146, as indicated by dimension D1 at FIG. 2A, can be less than half of the width 132, less than half of the width 202, less than half the maximum width of the vehicle 100, less than 30 inches, less than 24 inches, and/or less than 20 inches. In the example shown, the longitudinal centerlines 145, 147 of the first and second manual input devices 144, 146 are parallel to the longitudinal centerline 148. However, other configurations are possible in which one or both of the longitudinal centerlines 145, 147 are disposed at an oblique angle to the longitudinal centerline 148.

In other embodiments, the first and second widths 151, 153 can range between about 10% and about 90% of the distance between the longitudinal centerline 148 of the vehicle 100 and the first or second side 128, 130 of the rear platform 108. For example, in one embodiment, either of the first or second widths 151, 153 can be about 20%, 25%, 30%, 35%, 40%, 45%, 50%, 55%, 60%, 70%, 75%, 80%, or 85% of the distance between the longitudinal centerline 148 of the vehicle 100 and the first or second side 134, 136 of the control console 111. In other embodiments, the first and second widths 151, 153 can be defined between the longitudinal centerline 148 of the vehicle 100 and at least one of the first or second side 128, 130 of the rear platform 108, or the first or second side 114, 116 of the of the vehicle 100. In some embodiments, the first and second widths 151, 153 can have a linear dimension of about 10 inches, although other distances are also contemplated.

In another characterization, the first manual input device 144 is entirely within a distance 151*a* of the longitudinal centerline 148 while the second manual input device 146 is entirely within a distance 153*a* of the longitudinal centerline 148. In examples, the distance 151*a* is 50 percent or less of the distance from the longitudinal centerline 148 to the outermost left side of the vehicle 100. In examples, the distance 153*a* is 50 percent or less of the distance from the longitudinal centerline 148 to the outermost right side of the vehicle 100. In examples, the distance 151*a* is 50 percent or less of the distance from the longitudinal centerline 148 to the first side 134 of the control console 111. In examples, the distance 153*a* is 50 percent or less of the distance from the longitudinal centerline 148 to the second side 136 of the control console. In examples, the sum of the distances 151*a* and 153*a* are 50 percent or less than the width of the vehicle 100 and/or 50 percent or less than the width 132 of the control console 111. Stated another way, the entireties of the first and second manual input devices 144, 146 are within 50 percent or less of the width of the vehicle 100 and/or within 50 percent or less of the width of the control console 111.

With additional reference to FIG. 2A, a rear elevation view depicting a compact utility vehicle 100 with a user 200 standing on a rear platform 108 of the vehicle 100 is depicted in accordance with embodiment of the disclosure. In embodiments, the user 200 can define a biacromial breadth 202, alternatively referred to as a shoulder width. Although the biacromial breadth 202 can vary depending on factors such as age, sex, and body type, the average biacromial breadth, which is the distance between the two acromion processes of the scapulae, is approximately 40-45 cm for adult males and 35-41 cm for adult females. In some embodiments, the longitudinal centerline 145 of the first manual input device 144 and the second longitudinal centerline 147 of the second manual input device 146 can be spaced along the lateral direction 118 of the vehicle 100 within the biacromial breadth 202 of the user 200 standing on the rear standing platform 108. Applicants of the present disclosure have found that positioning the first and second manual input devices 144, 146 within the biacromial breadth 202 or within first or second widths 151, 153, and thus directly in front of an operator standing on the rear platform 108, results in improved ergonomics, as well as improved stability of the operator during operation of the vehicle 100.

In some embodiments, the first manual input device 144 can be configured to control the ground engaging wheels or tracks 106, while the second manual input device 146 can be configured to control operation of the implement 102. For example, in some embodiments, the first manual input device 144 includes at least one handle operated pivotal control member such as a joystick, a dual joystick, or dual lever control system arranged to independently control the forward and reverse direction for each ground engaging wheel or track 106. As presented, one or more rigid guards or grab bars 150 are fixedly coupled to the control console 111. In one aspect, the rigid guards or grab bars 150 are provided in front of and in back of input device 144 and allow the user to rest portions of his or her hand or fingers on grab bars 150 when operating input device 144. An example arrangement including a first manual input device 144 and grab bars 150 can be found in U.S. Pat. No. 9,970,176, the entirety of which is incorporated herein by reference. In some embodiments, the first manual input device 144 can be positioned on a left side of the vehicle 100 and the second manual input device 146 can be positioned on the right side of the vehicle 100. In other embodiments, the positions of the first and second manual input devices 144, 146 can be reversed. With continued reference to FIG. 2, it can be seen that both the input devices 144, 146 are located within the width 126 of the rear platform 108 and above at least a portion of the rear platform 108.

In some embodiments, the second manual input device 146 can include a base portion 152, a rigid grip 154, and a control head 156. The rigid grip 154 provides the user with a stability point during operation of the vehicle. The base portion can be operably coupled to either of the panels 138, 140 of the control console 111. In some embodiments, the rigid grip 154 can have a substantially cylindrical cross-section, or other cross-section ergonomically fitting within a palmer grasp of an operator.

Figure 5A:
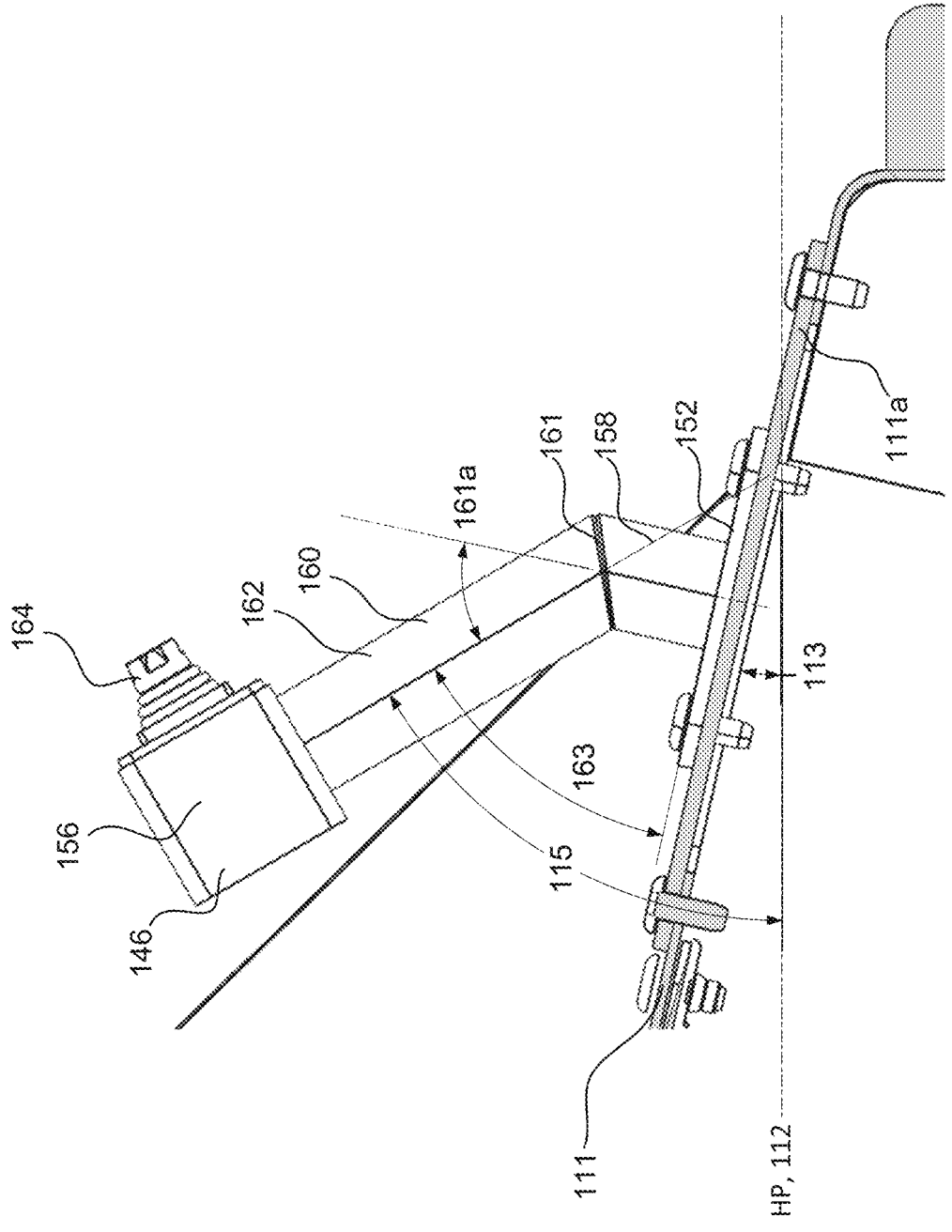
FIG. 5A is a partial cross-sectional side view of the control console shown in FIG. 5.

In one aspect, the rigid grip 154 can include a first portion 158 and a second portion 160 defining a palmer gripping surface 162. In some embodiments, the rigid grip 154 can define a bend 161 between the first portion 158 and the second portion 160. With reference to FIG. 5A, the bend 161 is such that the second portion 160 of the rigid grip 154 is disposed at an angle 161a relative to the first portion 158 of between about 30 degrees and about 60 degrees relative to the first portion 158, although other bend angles are also contemplated. In the example shown, the angle 161a is about 42 degrees. With continued reference to FIG. 5A, the second portion 160 is also shown as being disposed at an oblique angle 163 relative to the base portion 152. In examples, the angle 163 is between about 10 degrees and about 60 degrees, although other mounting angles of the palmer gripping surface 162 are also contemplated; for example, angle 163 can be between about 10 degrees and 30 degrees, between about 15 degrees and 60 degrees, between about 30 degrees and 60 degrees, and between about 30 degrees and 45 degrees. In the example shown, the angle 163 is about 47 degrees. It is further noted that the base plate 111a of the control console 111 is disposed at an oblique angle 113 to the longitudinal axis or direction 112 of the vehicle 100 and to a horizontal plane HP, when the vehicle 100 is resting on a level ground surface. The angle 113 may be, for example, between 0 and 30 degrees, between 5 and 20 degrees, and between 10 and 15 degrees. In the example shown, the angle 113 is about 13 degrees. In view of such a configuration, the second portion 160, including the palmar gripping surface 162, of the second manual input device 146 is disposed at an angle 115 relative to the axis or direction 112 and to the horizontal plane HP that is the sum of angles 113 and 163. Angle 115 can also be defined as an angle between the second portion 160 and the platform 108, when the platform is in the longitudinal or operating position. The angle 115 may be, for example, between 15 and 90 degrees, between 30 and 75 degrees, between 30 and 60 degrees, and between 30 and 45 degrees. In the example shown, the angle 115 is about 60 degrees.

Applicants of the present disclosure have found that positioning of the second manual input device 146 improves the ergonomic fit and stability of the user, commonly in a standing position, during operation of the vehicle 100. It is also noted that, since all drive-related controls are provided at input device 144, the operator can use the elongate grip 154 of the input device 146 for stabilization purposes to better operate the input device 144.

The control head 156 of the second manual input device 146 can be operably coupled to the second portion 160 of the rigid grip 154. In some embodiments, the control head 156 can include a thumb switch control portion 164 with a control interface 168 having a plurality of control surfaces 166 associated with sensors to provide signals to control operation of the implement 102. For example, in one embodiment, the thumb switch control portion 164 can be configured as a thumbstick 164 having a plurality of control surfaces. A thumbstick may alternatively be referred to as a joystick or thumb pad which can be moved in different directions by a user's thumb, which in turn is translated into control signals for operation of the implement 102. The thumb switch control portion 164 may also be configured to include one or more buttons, switches, dials, and/or any other manual input device. In examples, the control head, rigid grip, and base are hollow and/or have openings such that wiring can be routed from the thumbstick 164 to the control console 111.

As depicted, in some embodiments, the implement 102 can be in the form of a bucket (alternatively referred to herein as a "hopper" or "tub"), mounted near a front of the vehicle 100. In embodiments, the bucket can be made of a single piece plastic or constructed using steel or other metallic elements, which can be useful in carrying building materials, such as sand, soil, and cement among other things. In some embodiments, these materials can be discharged or dumped out of the bucket through manipulation of the implement 102, for example, via a hydraulic cylinder or motor, electric drive, or other actuation or rotational drive mechanism.

Figures 6A, 6B:
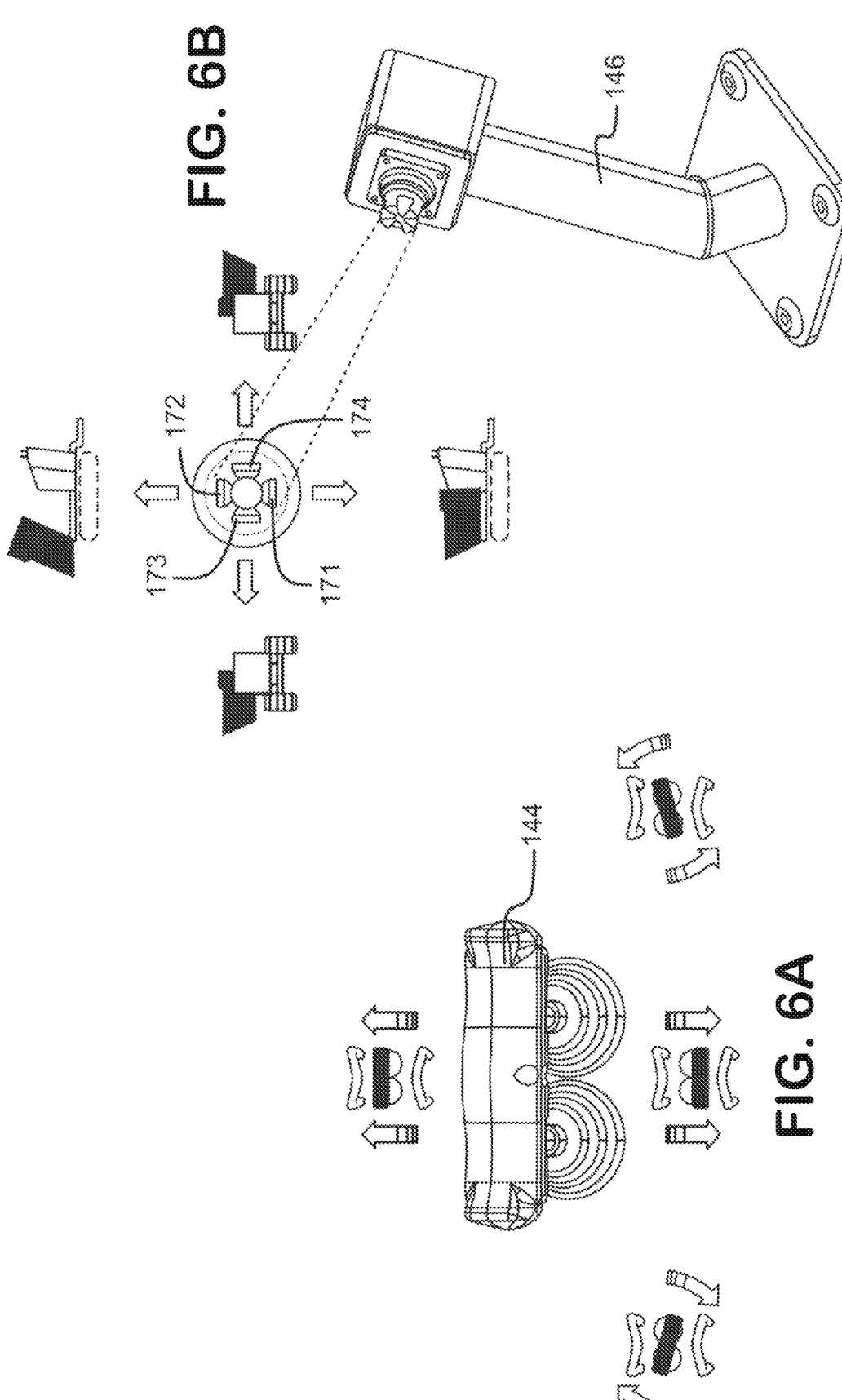
FIGS. 6A-B are schematic views depicting controls of an implement, in accordance with embodiments of the disclosure.

With additional reference to FIG. 6A, in some embodiments, the first manual input device 144 can include a plurality of switches and/or mechanical inputs configured to enable control over movement of the vehicle 100. For example, pressing the first manual input device 144 in a forward direction causes forward motion of the vehicle 100. Pulling back on the first manual input device 144 in a rearward direction causes rearward motion of the vehicle 100. Rotation of the first manual input device 144 in either a clockwise or counterclockwise direction causes turning of the vehicle 100.

With additional reference to FIG. 6B, in some embodiments, the second manual input device 146 can include a first switch 171 configured to return the implement 102 to a return or home position, alternatively referred to as a lowered, loaded position, and a second switch 172 configured to drive the implement 102 to a raised dumping position, in which the bucket is tipped forward or pivoted relative to the lateral direction 118 of the chassis 104. In some embodiments, the second manual input device 146 can include a third switch 173 configured to pivot the implement 102 in a first direction (e.g., to the left), and a fourth switch 174 configured to pivot the implement in a second direction (e.g., to the right), such that the third and fourth switches 173, 174 enable pivoting or rotation of the implement 102 relative to a vertical direction 124 of the chassis 104 over a range of about 180 degrees. In other embodiments, the third and fourth switches 173, 174 can be configured to actuate other functions, such as lifting of the implement 102 with the aid of a scissors jack or other bar linkage assembly.

In some embodiments, the second manual input device 146 can be biased in control of the implement 102, such that absent user input, one or more of the switches are activated, thereby moving the implement 102 to a particular position. For example, in some embodiments, removal of a user's hand from the second manual input device 146 can cause the implement 102 to return to the home position.

In one embodiment, the vehicle 100 offers intuitive and easy-to-use controls, superior traction, and maneuverability with increased productivity and job efficiency. In one embodiment, the vehicle 100 includes a unique thumb-controlled dump switch that is linked to the movement of the tub and is always near the operator's thumb for easy access. The auto-return dump feature ensures the tub automatically returns to the resting position, allowing the operator to quickly focus on obtaining the next load of material.

In one embodiment, the vehicle 100 has a carrying capacity of about 2,500 lbs, powered by an engine rated at least at about 25 hp, enabling speeds up to about 6 mph. In one embodiment, the vehicle 100 includes rugged aramid cord reinforced tracks ensuring maximum strength and performance. In one embodiment, the vehicle 100 includes a polyethylene tub material and a 16 cubic feet tub capacity (0.45 m3), with a discharge height of 12.75 inches (32.39 cm) and a hydraulic dumping system. In one embodiment, the vehicle 100 can have an overall length of about 105 inches (268 cm), an overall width of about 36 inches (90 cm), and an overall height of about 48 inches (120 cm), with a weight of about 1600 lbs (734 kg); although other vehicle dimensions are also contemplated. In one embodiment, the vehicle 100 has a fuel tank with a capacity of about 10 gallons (44 liters).

Figure 7:
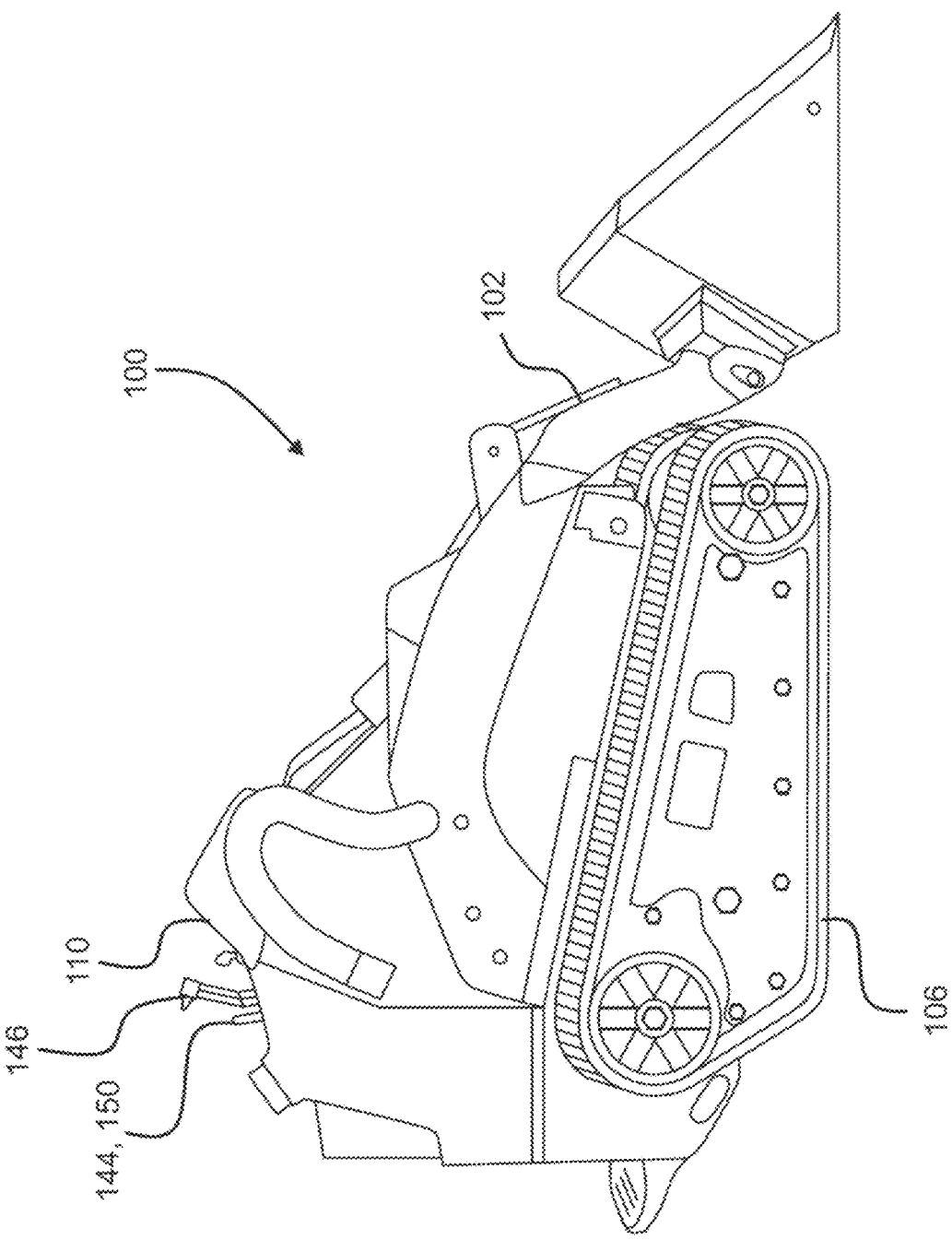
FIG. 7 is a perspective view depicting an alternative compact utility vehicle, in accordance with an embodiment of the disclosure.

As further depicted by FIG. 7, in other embodiments, the vehicle 100 can be in the form of a front end loader or other type of light utility vehicle having a maneuverable implement 102, and control console 111. The vehicle 100 can be provided in a walk-behind configuration and can also be provided with a movable or fixed rear platform upon which the operator can stand during operation of the vehicle 100. For example, in some embodiments, the implement 102 can be at least one of a loader bucket, adjustable fork, grapple, auger, trencher, utility blade, or the like. In one embodiment, the vehicle 100 includes vertical lift loader arms with between a 700-1000 lb operating capacity. In one embodiment, the vehicle 100 is intuitive to operate, and its small size and power make it the ideal machine for both homeowners and contractors working within the confines of tight spaces, expanding labor savings beyond homeowner projects.

Further Examples

Figures 8, 8A:
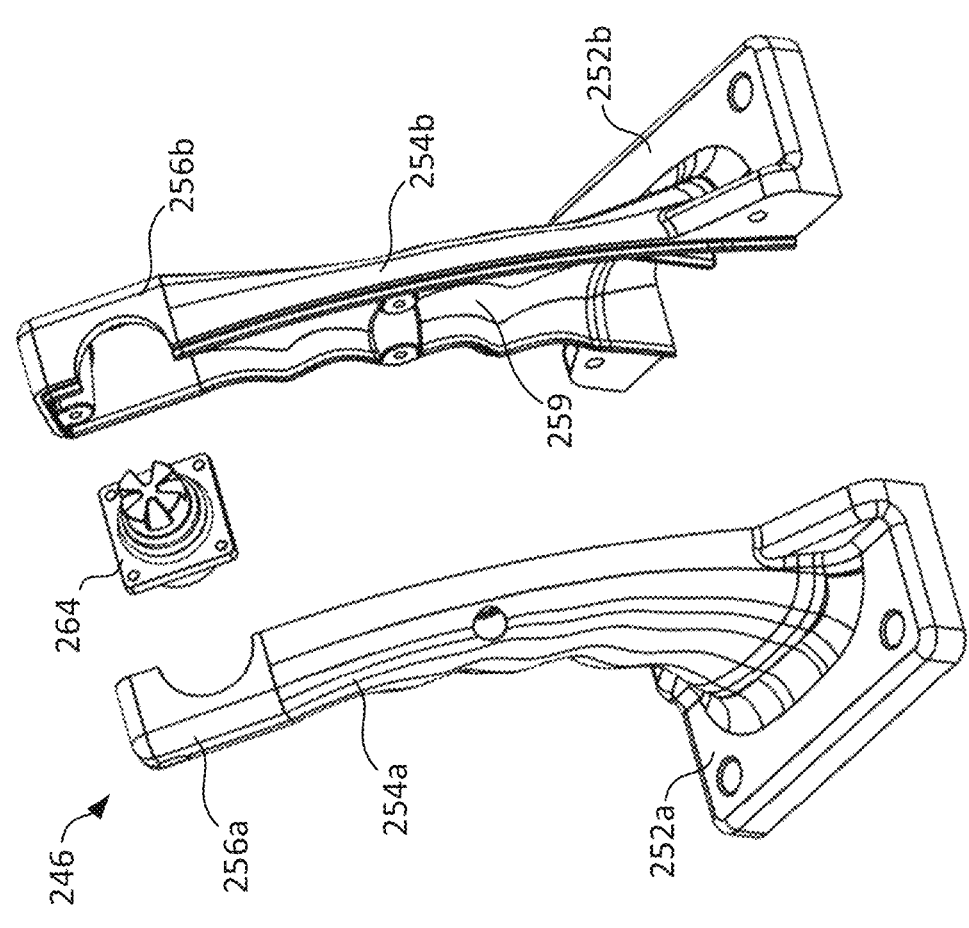
FIG. 8 is a perspective view depicting an example manual input device usable with the compact utility vehicles disclosed herein, and others.
FIG. 8A is an exploded perspective view of the manual input device shown in FIG. 8.
Figure 9:
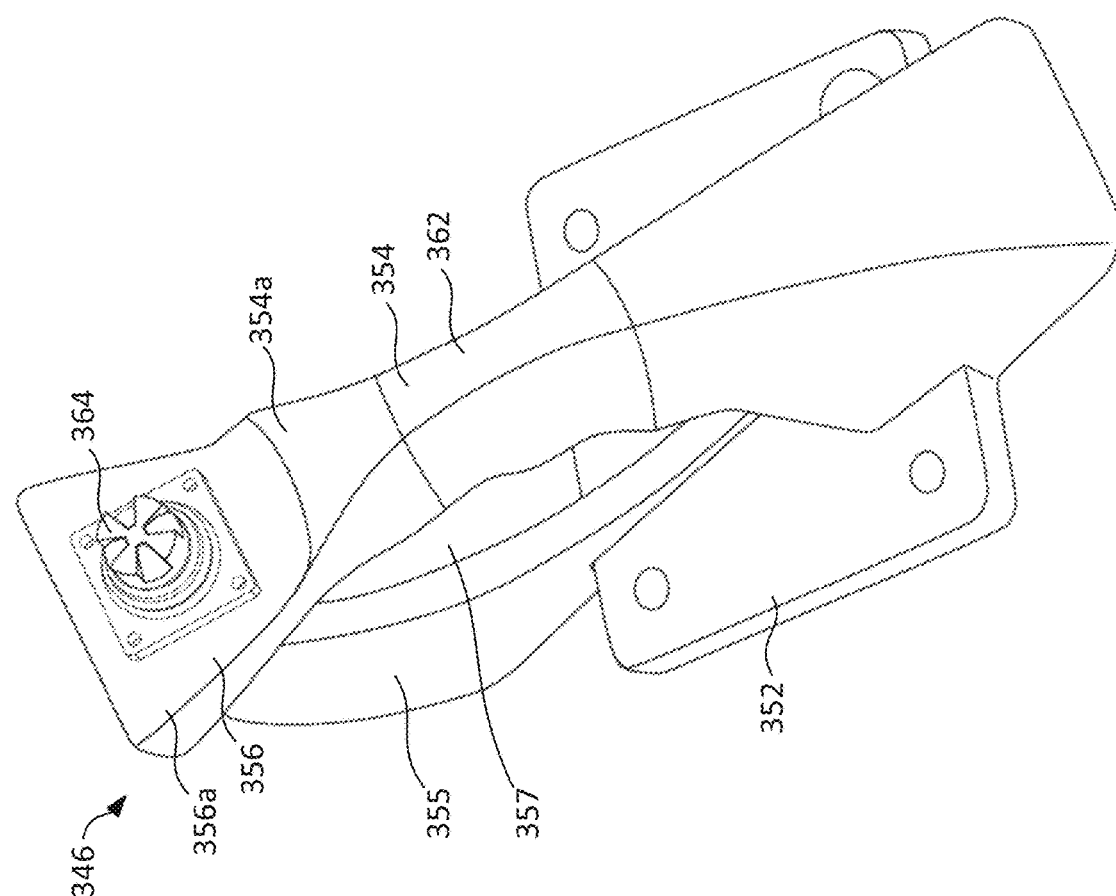
FIG. 9 is a perspective view depicting an example manual input device usable with the compact utility vehicles disclosed herein, and others.
Figures 17, 18, 19:
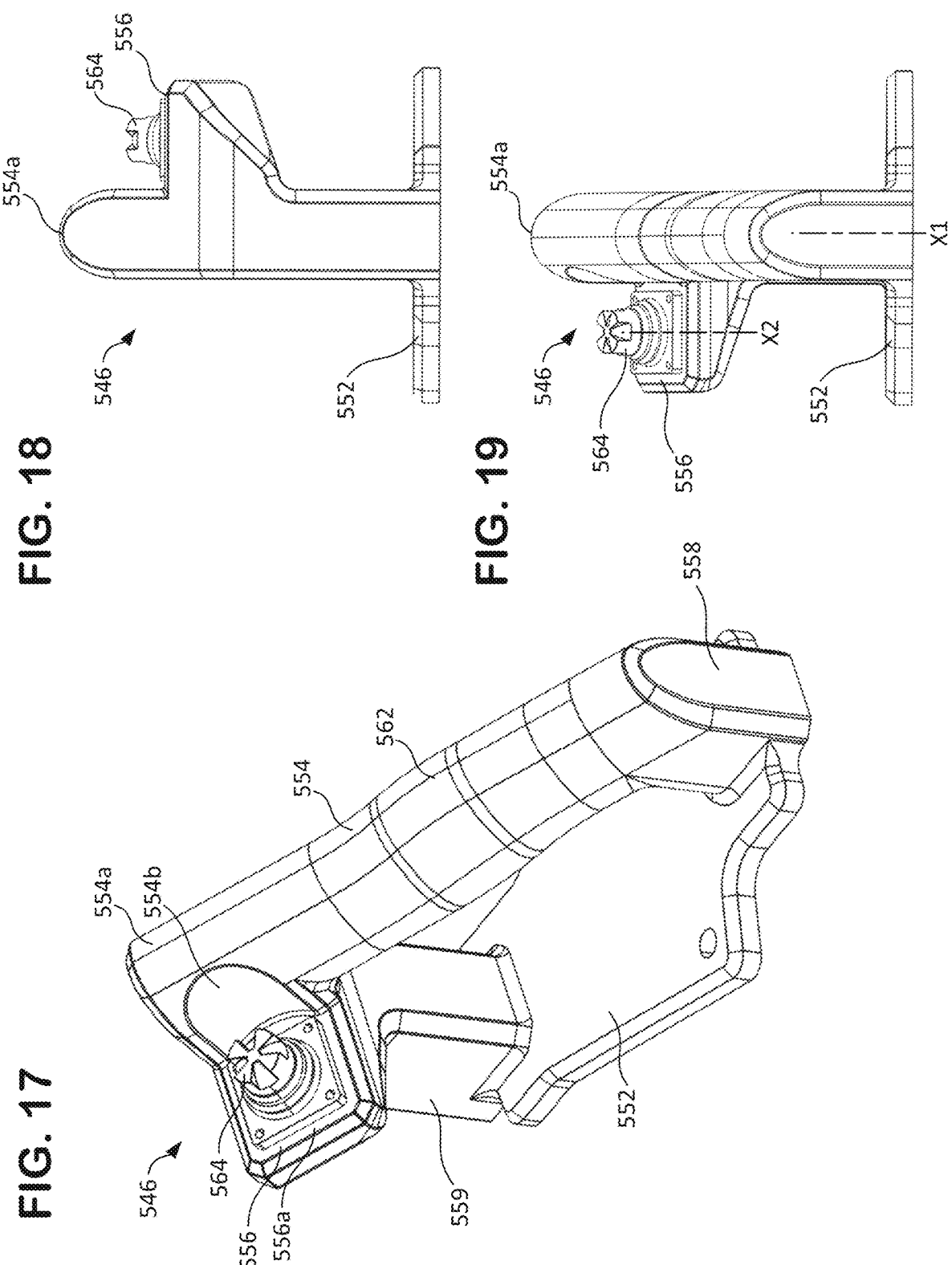
FIG. 17 is a perspective view depicting an example manual input device usable with the compact utility vehicles disclosed herein, and others.
FIG. 18 is a front end view of the manual input device shown in FIG. 17.
FIG. 19 is a rear end view of the manual input device shown in FIG. 17.
Figures 20, 21, 22, 23:
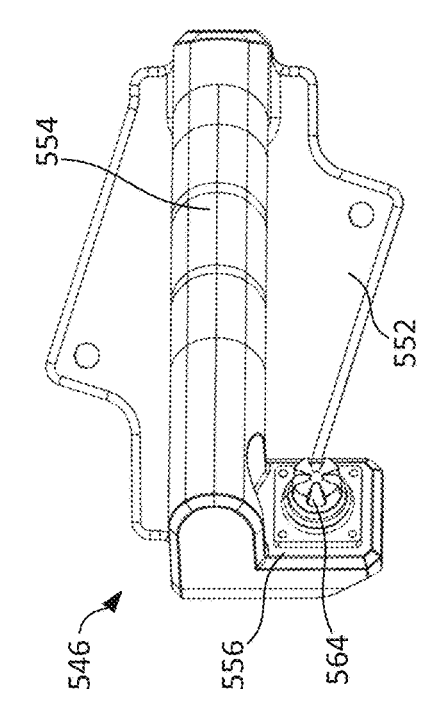
FIG. 20 is a first side view of the manual input device shown in FIG. 17.
FIG. 21 is a second side view of the manual input device shown in FIG. 17.
FIG. 22 is a top view of the manual input device shown in FIG. 10.
FIG. 23 is a bottom view of the manual input device shown in FIG. 10.

Referring to FIGS. 8 to 23, additional examples of a second manual input device are shown that may be mounted to the base plate 111a of the control console 111, wherein FIGS. 8 and 8A show a second manual input device 246, FIG. 9 shows a second manual input device 346, FIGS. 10 to 16 show a second manual input device 446, and FIGS. 17 to 23 show a second manual input device 546. The second manual input devices 246, 346, 446, 546 have many features in common with second manual input device 146 and the above-provided description is largely applicable for these additional examples as well. Where such similarities exist, like reference numbers are used and the description need not be repeated here. For example, each of the second manual input devices 246, 346, 446, and 546 utilize the same thumb switch and related controls as already described for second manual input device 146. This section will instead focus on the differences among the various designs.

With reference to FIGS. 8 and 8A, showing second manual input device 246, one such difference is that the rigid grip portion 254 extends into the base portion 252 and can be provided with a contoured or ergonomic palmer gripping surface 262 with various raised portions or ridges 262a and recessed portions 262b shaped to receive portions of a user's fingers. By use of the term 'contoured' or 'ergonomic' it is meant to include gripping surfaces which are shaped in some way to improve a user's grasp and at least not entirely prismatic in nature (e.g., cylinder-shaped or polygonal-shaped). The second manual input device 246 also illustrates that one or more of the base portion 252, grip portion 254, and control head portion 256 may be provided with a two-part design. In the example shown a two-part design is provided with a longitudinal split in which a first half, forming a half base portion 252a, a half grip portion 254a, and half control head portion 256a, is joined with a second half, forming a half base portion 252b, a half grip portion 254b, and half control head portion 256b. In the example shown, mechanical fasteners 257 are used to secure the halves together. Other arrangements may be utilized, such as snap-fit features integral to each half. With the disclosed construction, the thumb switch 264 can be secured and/or clamped between the halves with or without additional fasteners. As can also be seen at FIG. 8A, the body halves are provided with a generally hollow interior creating a cable routing pathway 259 from the thumb switch 264 through a bottom of the base portion 252 which allows for control wiring to extend through the interior of the second manual input device 246 and to the vehicle controller.

With reference to FIG. 9, showing second manual input device 346, it can be seen that the rigid grip portion 354 extends to the base portion 352 and is also provided with a contoured or ergonomic palmer gripping surface 362. The second manual input device 346 is additionally provided with a support structure 355 extending between the base portion 352 and the end of the grip portion 354 proximate the control head portion 356. In contrast to an unsupported design, support structure 355 provides additional strength and stability to the forward-extending grip portion 354 such that the grip portion 354 can remain stable under potentially high loads exerted by a user during operation. As shown, the grip portion 354 and support structure 355 also define an interior space or opening 357 that allows a user's hand to extend therethrough. FIG. 9 also illustrates that a top surface 356*a* of the control head 356 can extend beyond the thumbstick 364 and provide an optional resting surface for a user's thumb. The top surface 356*a* is also shown as being recessed below a top or upper surface 354*a* of the grip portion 354 such that the top of the thumbstick 364 is lowered. Such a configuration can allow a user's thumb can more naturally extend from the top surface 354*a* to the top of the thumbstick 364.

Referring to FIGS. 10-16, showing second manual input device 446, it can be seen that the rigid grip portion 454 is supported between a first support portion 458 at one end and a second support portion 459 at the opposite end. With such a configuration, the second support portion 459 serves a similar function to the support structure 355 shown in FIG. 9. As shown, the rigid grip portion 454 and support portions 458, 459 define an interior space or opening 457 that allows a user's hand to extend therethrough. In contrast to other disclosed embodiments, the angle 463 of the rigid grip portion 454 relative to a top surface of the base portion 452 is significantly reduced such that angle is closer to zero or parallel. The angle 463 is between about 10 and 45 degrees, between about 10 and 30 degrees, and in the example shown, about 15 degrees. Accordingly, when mounted to base plate 111*a*, the angle of the grip portion 454 relative to the longitudinal axis of the vehicle 100 or horizontal plane is between about 20 and 60 degrees, between about 20 and 45 degrees, and in the example shown, about 28 degrees. Similarly to second manual input device 346, second manual input device 446 also includes a control head top surface 456*a* that is recessed from or lowered in comparison to a top surface 454*a* of the grip portion 454 such that the top surface 454*a* is closer to the base portion 452 in comparison to the top surface 454*a* at the end proximate the control head 456. Accordingly, the thumb control 464 is likewise lowered relative to the top surface 454*a*. It is also noted that the top surface 456*a* is generally horizontal or parallel to the base portion 452 and is thus disposed at an oblique angle to the top surface 454*a* of the grip portion 454. Similar to second manual input device 146, the gripping surface 462 is generally smooth and non-contoured, although the grip portion 454 is provided with an oval shape. As most easily viewed at FIG. 16, the second manual input device 446 is provided with a generally hollow construction that defines a cable routing pathway 460.

Referring to FIGS. 17 to 23, showing second manual input device 546, it can be seen that this example is generally similar to second manual input device 446 shown in FIGS. 10 to 16 in that first and second support portions 558, 559 are provided with the grip portion 554 extending at a relatively shallow angle 563. However, several differences exist. For example, in contrast to second manual input device 446, second manual input device 546 is provided with an ergonomic or contoured gripping surface 562. Further, and as most easily seen at FIG. 19, the control head 556 and thumbstick 564 are laterally offset from a longitudinal axis X1 of the grip portion 554 and aligned along a separate axis X2. Further, the control head 556 and thumbstick 564 are located alongside the grip portion 554. This is in contrast to each of the prior disclosed second manual input devices 146, 246, 346, 446 in which the control head, thumbstick, and grip portion are aligned along a common longitudinal axis with the control head 556 and thumbstick 564 extending axially beyond the grip portion. The top surface 556*a* of the control head 556 is also shown as being lower than the top surface 554*a* of the grip portion 554 at a location proximate the control head 556. However, the top surface 556*a* is lowered to an extent that the top of the thumbstick 564 is entirely below the top surface 554*a* which defines the uppermost portion of the second manual input device 546, at least when the base portion 552 is placed in a horizontal position. At the location of the thumbstick 564, the grip portion 554 is also shown as being provided with a scalloped or recessed portion 554*b* to facilitate movement of the thumbstick 564 in a direction towards the grip portion 554 during operation. In contrast to the top surface 454*a*, the top surface 554*a* is generally parallel with the longitudinal axis X1 of the grip portion 554 in which both are oriented at an angle 563. The angle 563 is between about 15 and 60 degrees, between about 15 and 45 degrees, and in the example shown, about 30 degrees. Accordingly, when mounted to base plate 111*a*, the angle of the grip portion 554 relative to the longitudinal axis of the vehicle 100 or horizontal plane HP is between about 30 and 75 degrees, between about 30 and 60 degrees, and in the example shown, about 43 degrees. In the example shown, the control head 556 and thumbstick 564 are located to the left of the grip portion 554 since the second manual input device 546 is configured for use on the right side of the vehicle and to be grasped by a user's right hand. However, in other applications where a left-hand control is utilized, the control head 556 and thumbstick 564 may be located on the opposite lateral side. As most easily viewed at FIG. 23, the second manual input device 546 is provided with a generally hollow construction that defines a cable routing pathway 560.

The above-described features for each of the second manual input devices 146, 246, 346, 446, and 556 may be provided in various combinations. For example, the second manual input devices 146, 346, 446, and 556 may be provided with a two-part construction similar to that shown for second manual input device 246. In examples, the second manual input devices 146, 246 may be provided with a recessed control head and thumbstick associated with second manual input devices 346, 446, and 546. In examples, the second manual input devices 146, 446 are provided with an ergonomic or contoured grip surface of the type shown for second manual input devices 246, 346, and 546. In examples, the second manual input devices 146, 246, 346, 446 can be provided with a laterally offset control head and thumbstick of the type shown for second manual input device 546. In some examples, the second manual input devices 146, 246, 346, 446, and/or 546 may be mounted to the control console 111 such that a longitudinal axis of the handle or grip portion is at an oblique angle to a longitudinal centerline or axis of the control console and/or vehicle. For example, the second manual input devices 146, 246, 346, 446, and/or 546 may be mounted such that the forward portion of the handle, relative to the operator and vehicle, is toed inwardly in a direction towards the first manual input device 144 such that the front part of the second manual input device is closer to the longitudinal centerline 148 in comparison to a rear part of the manual input device. Such an orientation may be advantageous from an ergonomic standpoint as the operator's wrist can remain in a more natural position when grasping the second manual input device. An oppositely angled configuration is also possible.

In operation, a user can stand on the rear platform 108, using a first hand to manipulate the first manual input device 144, and a second or opposite hand to manipulate the second manual input device 146, 246, 346, 446, 546 which can also be used as a rigid support for the user. In examples, a thumb of the user can manipulate the thumb switch control portion of the second manual input device 146, 246, 346, 446, 546 to control operation of the implement 102. It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A manual input device for operating a compact utility vehicle, the manual input device comprising:
    a base defining a first mounting surface for attachment to the vehicle;
    a handle defining a grip portion extending along a longitudinal centerline between a front end and a rear end, the handle being rigidly mounted to or formed with the base to define an opening for allowing an operator's fingers to extend through; and
    a control mounted to the handle proximate the front end and forward of the grip portion, the control including a thumbstick aligned along the longitudinal centerline and defining a plurality of control surfaces associated with sensors to provide signals to control operation of the vehicle.

2. The manual input device of claim 1, wherein the handle is formed with a hollow construction defining a cable routing pathway between the base and the control.

3. The manual input device of claim 1, wherein the handle defines first and second support portions extending from the base to support the grip portion such that the grip portion, the first and second support portions, and the base define the opening.

4. The manual input device of claim 3, wherein the grip portion extends along a longitudinal axis that is disposed at a first angle to a plane extending through the base, the first angle being an oblique angle.

5. The manual input device of claim 4, wherein the first angle is between about 15 and 45 degrees.

6. The manual input device of claim 5, wherein the first angle is about 15 degrees.

7. The manual input device of claim 1, wherein the grip portion has a generally oval cross-sectional shape.

8. The manual input device of claim 7, wherein an uppermost portion of the grip portion is closer to the first mounting surface in comparison to an uppermost portion of the thumbstick.

9. The manual input device of claim 8, wherein the handle includes a second mounting surface to which the control is mounted, wherein the second mounting surface is closer to the first mounting surface in comparison to the uppermost portion of the grip portion.

10. The manual input device of claim 9, wherein the first mounting surface is generally parallel to the second mounting surface.

11. The manual input device of claim 1, wherein at least a portion of the handle is forward of the thumbstick.

12. A manual input device for operating a compact utility vehicle, the manual input device comprising:
    a base defining a first mounting surface for attachment to the compact utility vehicle;
    a handle defining a grip portion extending along a longitudinal centerline between a front end and a rear end, the grip portion being supported by first and second support portions extending from the base, wherein the grip portion, the first and second support portions, and the base define an opening for allowing an operator's fingers to extend through; and
    a control mounted to the handle proximate the front end, the control including a thumbstick defining a plurality of control surfaces associated with sensors to provide signals to control operation of the compact utility vehicle, wherein the handle is formed with a hollow construction defining a cable routing pathway between the base and the control.

13. The manual input device of claim 12, wherein the thumbstick is mounted at a location that is aligned with the longitudinal centerline and forward of the grip portion.

14. The manual input device of claim 13, wherein the thumbstick is mounted at a location that is offset from the longitudinal centerline.

15. The manual input device of claim 14, wherein the grip portion includes a recessed portion proximate the thumbstick to facilitate movement of the thumbstick in a direction towards the grip portion.

16. The manual input device of claim 12, wherein the handle includes a second mounting surface to which the control is mounted, wherein the second mounting surface is closer to the first mounting surface in comparison to an uppermost portion of the grip portion.

17. The manual input device of claim 12, wherein an uppermost portion of the thumbstick is closer to the base in comparison to an uppermost portion of the grip portion.

18. A manual input device for operating a compact utility vehicle, the manual input device comprising:
    a base defining a first mounting surface for attachment to the compact utility vehicle;
    a handle defining a grip portion extending along a longitudinal centerline between a front end and a rear end, the handle being rigidly mounted to or formed with the base; and
    a control mounted to the handle proximate the front end and forward of the grip portion, the control including a thumbstick aligned along the longitudinal centerline and defining a plurality of control surfaces associated with sensors to provide signals to control operation of the compact utility vehicle, wherein the handle is formed with a hollow construction defining a cable routing pathway between the base and the control.

19. The manual input device of claim 18, wherein the grip portion includes a contoured gripping surface with a plurality of ridges and recessed portions shaped to receive an operator's fingers.

20. The manual input device of claim 18, wherein the manual input device is formed with a two-part design including a first half and a second half joined together along the longitudinal centerline, each of the first and second halves forming a portion of the base and the handle.

\* \* \* \* \*